March 27, 1945.   L. HERKERT   2,372,204
TUBULAR REMOTE CONTROL DEVICE
Filed April 10, 1941   2 Sheets-Sheet 1
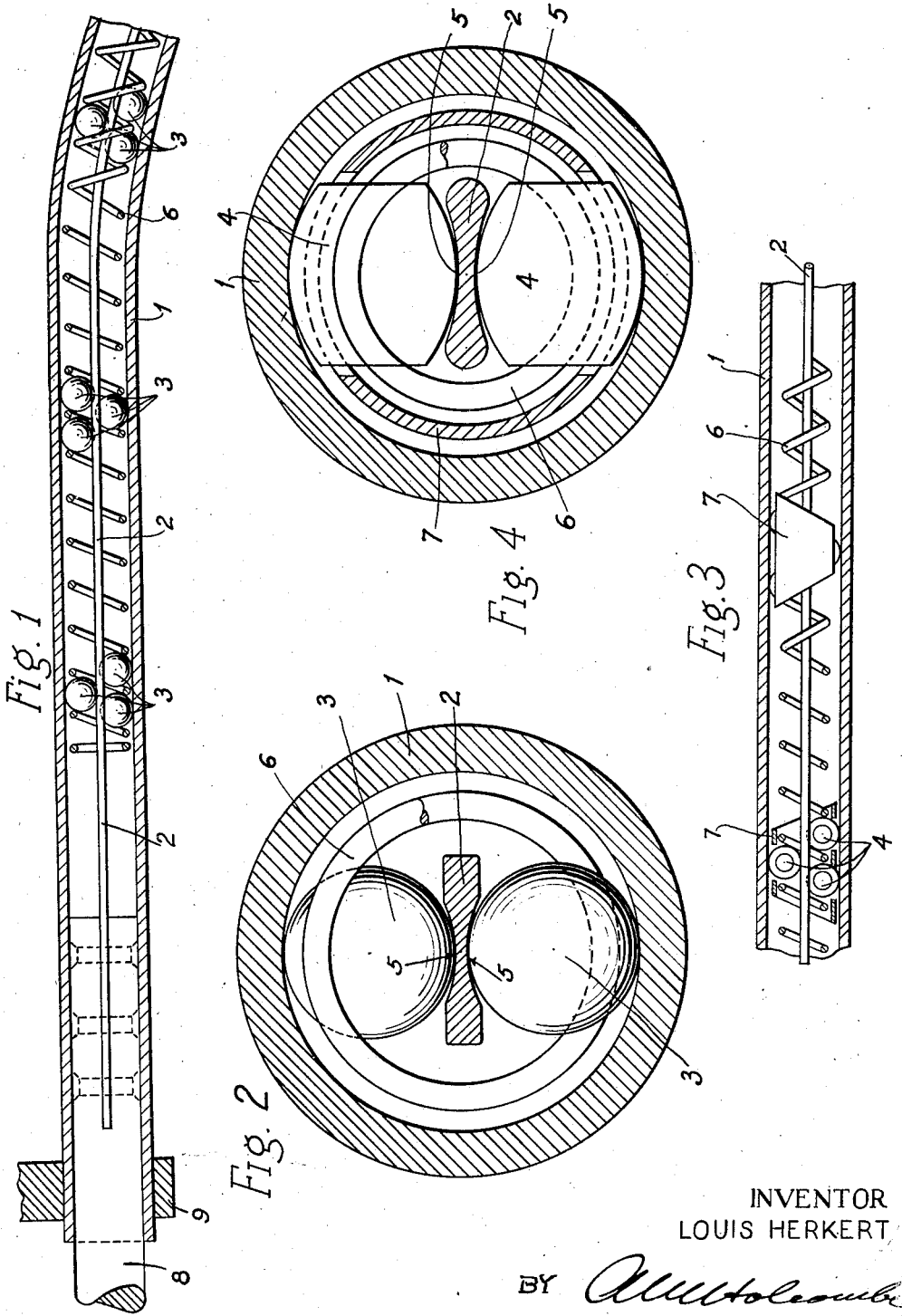
INVENTOR
LOUIS HERKERT
BY
ATTORNEY.

March 27, 1945. L. HERKERT 2,372,204
TUBULAR REMOTE CONTROL DEVICE
Filed April 10, 1941 2 Sheets-Sheet 2
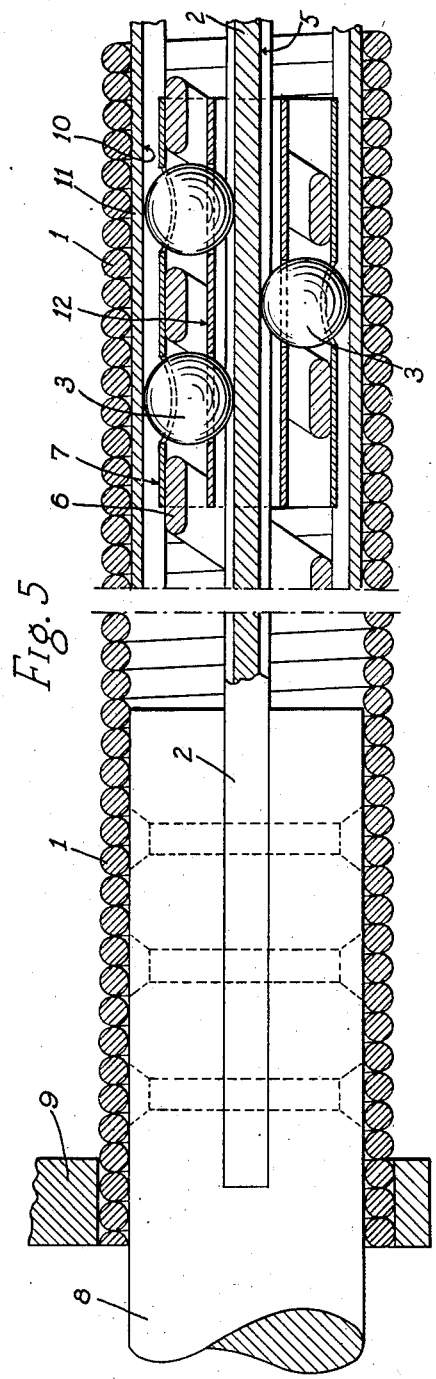
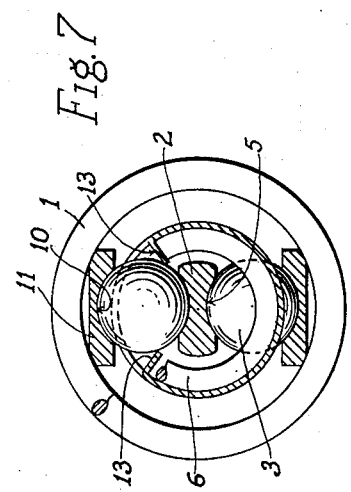
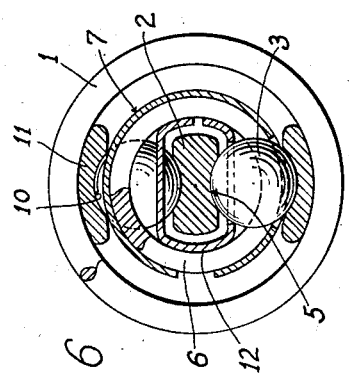
INVENTOR
LOUIS HERKERT
By *[signature]*
ATTORNEY.

Patented Mar. 27, 1945

2,372,204

UNITED STATES PATENT OFFICE 2,372,204

TUBULAR REMOTE-CONTROL DEVICE

Louis Herkert, Boulogne-sur-Seine, France; vested in the Alien Property Custodian Application April 10, 1941, Serial No. 387,794
In France April 10, 1940

2 Claims. (Cl. 74—501)

This invention relates to tubular remote control devices for transmitting compression or traction forces by the action of a flexible rod moving axially to and fro in a sheath and acting upon a controlled element, for instance a brake or a contact, situated at a certain distance from the operating point.

It is an object of this invention to provide an improved device of this kind, having a high mechanical efficiency and a very reliable operation. It is also an object of this invention to provide a tubular remote control device of a very simple design, constructed of wear resistant materials of high quality. Other objects will be evident from the reading of the present specification and will be finally pointed out in the claims.

According to the invention the device consists essentially of a flexible strip or band maintained and supported in the center of a rigid or a flexible sheath by rolling members, mounted on both sides of the band and bearing on the one hand upon the band and on the other hand upon the inside surface of the sheath.

Fig. 1 shows a longitudinal section through a form of the remote control device, using a rigid sheath.

Fig. 2 is a cross section of the same in the case of balls used as rolling means.

Fig. 3 is a longitudinal section of a modification of the device according to Fig. 1, comprising cages for rolling means.

Fig. 4 is a cross section of Fig. 3 showing the use of rollers.

Fig. 5 is a longitudinal section through a device comprising a flexible sheath.

Fig. 6 is a cross section through a device according to Fig. 5.

Fig. 7 is a cross section through a modification.

Referring now to the drawings, a sheath 1, which is rigid in the case of Figs. 1 to 4 and flexible in the case of Figs. 5 to 7, has a desired length and form according to the requirements and may comprise several bent or curved portions. A rigid sheath can consist of a solid tube which has been previously bent where it is desired to modify the direction of the force transmission; a flexible sheath can be formed by a metallic wire tightly wound to form a flexible hose.

Along the center of the sheath a strip or band 2 of metal, preferably having a high elastic limit, can be translated longitudinally; its form and cross section allow for its easy flexure in one of its planes of symmetry, the flexing being much more difficult in another plane at right angles to said plane of symmetry; the said strip can be easily twisted and consequently it follows the eventual bends of the sheath.

The strip 2 is supported in the center of the sheath 1 by rolling means 3 which can have the form of balls or rollers, mounted on its opposite faces and bearing, on the one hand, upon the strip, and on the other hand upon the inside of the sheath. Appropriate rolling tracks are preferably formed on both faces of the strip by grooves 5, provided on its flat surfaces. The rolling surfaces on the sheaths are formed in Figs. 1 to 4 directly by the inner surfaces of the rigid tubes, or, according to Figs. 5 to 7, by suitable grooves or channels 10 provided in the flexible bands 11, fixed on the inner surface of the sheath 1 and diametrically opposed.

The rolling elements 3 form groups which are held in a spaced relation along the sheath, every group comprising two, three or any other number of rolling elements. They can be mounted in pairs, one facing the other or alternately as shown in the drawings. These groups of rolling elements are distributed at such distances, that there is no risk of an inflexion of the strip 2 by compression.

Owing to the flat cross section of the strip 2, its faces always remain at right angles to the plane in which the sheath 1 has been bent, so that the strip normally rests upon the rolling members 3 or 4.

A helical spring 6 extends inside the sheath between its end portions, and every rolling element 3 is maintained in its position between two successive turns of this spring 6. The outside and inside diameters of this spring are such that it is not in contact with the sheath nor with the band. Its diameter and pitch are preferably so chosen that the rolling elements 3 are held by the spring against the band, so that it is possible to withdraw the spring out of the sheath without dropping of the said rolling elements.

If the spring is unable to maintain the rolling elements on the strip 2, every group of elements 3 can be maintained by one or several cages, as shown by the references 7 or 12. The cage 7 (Fig. 4 or Fig. 6) consists of a C-formed (opened) or O-formed (complete) tubular element enclosing a certain length of the spring 6 and having openings through which project parts of the rolling elements. The cage 12, shown in Fig. 6, also has a tubular C-formed or O-formed shape; it is located between the spring 6 and the strip 2 and prevents the rolling elements from escaping when the strip 2 is withdrawn from the sheath.

Each end of the band 2 is fixed to an end piece 8, one of which receives the tractive or the compressive effort to be transmitted and the other transmits the said effort to a receiving or controlled device. The ends of the sheath are fixed by appropriate means 9.

The modification shown in Fig. 7 is similar to the form corresponding to Fig. 6; however, in this modification the cage 12 has been omitted and recesses 13 formed in the cage 7 and pierced with an opening at their inside portion for the passage of the rolling elements prevent the rolling elements from escaping when the strip 2 is withdrawn from the sheath. Lugs or similar devices can be provided for the same purpose on the spring 6 itself.

It is understood that the embodiments as described can be modified within the scope of the present invention, and that the appended claims are not limited to the specific constructions here shown.

Having now described my invention what I claim as new and desire to secure by Letters Patent is:

1. A distant control tubular device comprising a tubular sheath, a flat metallic flexible band adapted to move to and fro in said sheath, a plurality of groups distant from each other of rolling elements inserted between said sheath and said band and adapted to maintain said band at a distance from said sheath and to roll both on said sheath and on said band during the displacements of said band, and a narrow helical spring disposed in said sheath about said band and maintaining said rolling elements between successive turns of said springs.

2. A distant control tubular device as claimed in claim 1 further comprising for each group of rolling elements a tubular cage disposed about said spring and provided with openings through which the rolling elements of said group extend.

LOUIS HERKERT.